April 8, 1930.  A. WIKSTROM  1,753,959
GUIDE WHEEL FOR WOODWORKING TOOLS
Filed Nov. 7, 1927
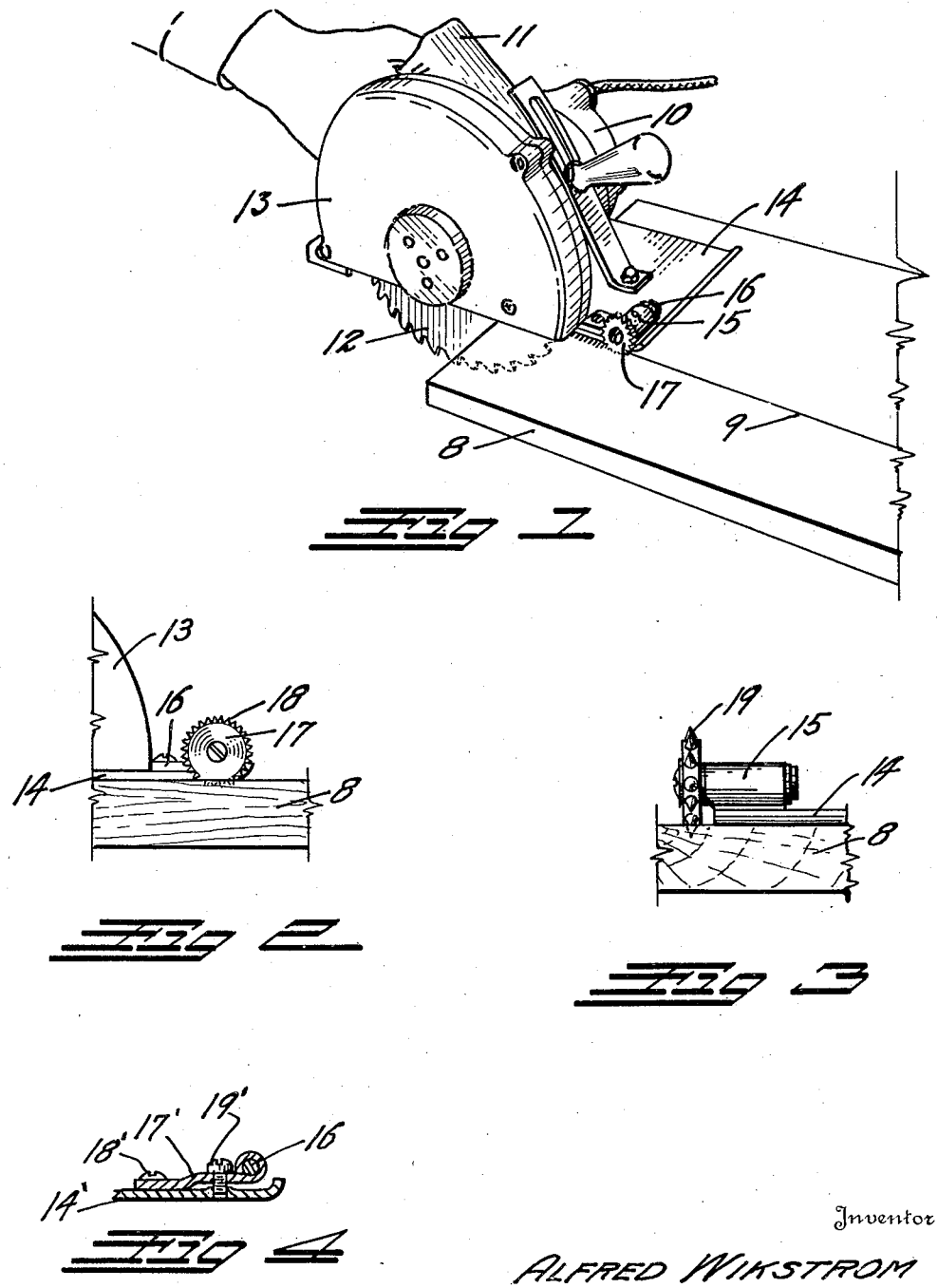
Inventor
ALFRED WIKSTROM Patented Apr. 8, 1930

1,753,959

UNITED STATES PATENT OFFICE

ALFRED WIKSTROM, OF ALBUQUERQUE, NEW MEXICO

GUIDE WHEEL FOR WOODWORKING TOOLS

Application filed November 7, 1927. Serial No. 231,498.

This invention relates to a device for guiding a power driven hand saw and has for its principal object the provision of a guide wheel which will travel ahead of the saw and prevent the grain of the wood etc. from causing the saw to depart from the guide line.

Another object of the invention is to provied a guide wheel for a power driven hand saw which will prevent the saw from becoming jammed or wedged in the saw cut.

Further object of the invention is to provide means on a power driven hand saw which will enable the operator to follow a guide line without it being necessary to use a straight edge or square.

A still further object of the invention is to so arrange the guide wheel that it can be adjusted to adapt it to woods of various hardness.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of a power driven hand saw with my invention embodied thereon.

Fig. 2 is a side elevation of the guide wheel employed in Fig. 1.

Fig. 3 is a detail view illustrating an edge elevation of an alternate form of a guide wheel.

Fig. 4 is a detail view illustrating a method of adjustably mounting the guide wheel. This view is a cross section taken through the guide wheel supporting bearing.

In the drawing a power driven hand saw of any of the usual types is illustrated with its motor at 10 provided with the usual operating handle 11, saw 12, saw guard 13, and base plate 14.

My invention is applied to the base plate 14 by attaching a bearing bracket 15 in which a shaft 16, is journaled. The shaft 16 carries at its one extremity a knurled wheel 17 attached thereto in any desired manner. The wheel 17 is preferably positioned so as to ride immediately ahead of the saw 12, and projects below the base plate 14 sufficiently to allow its teeth to enter the board being sawed.

Saws of this type are designed to enter the work from below so that the natural reaction of the saw is to draw the base plate 14 firmly against the work. This reaction acts to embed the teeth of the wheel 17 into the wood and this results in absolutely preventing the forward portion of the base plate from moving in a lateral direction, since the teeth of the wheel 17 will firmly lock it against sidewise movement.

After the saw has entered the board, the rear portion of the base plate is prevented from sidewise movement by the saw blade, so that the entire base plate will be firmly maintained in the position in which the saw is started, and cannot travel away from the entering line. In use the operator forces the saw forwardly keeping the wheel 17 on his guide line.

The form of the wheel 17 is immaterial as long as it is provided with teeth of some nature which will enter the woodwork. In Figs. 1 and 2 I have illustrated pointed, lateral, knurled teeth 18. In Fig. 3 I have illustrated another form in which the teeth comprise tapered spikes 19.

It may be desirable in some instances to have the guide wheel 17 adjustably mounted on the base plate 14, so that the amount of entrance of the teeth into the work can be regulated. Thus for hard woods where it is difficult for the teeth to enter and unnecessary that they be deeply embedded, the wheel could be set higher so that they will enter but a minimum, the opposite being true of soft wood.

In Fig. 4 I have illustrated a construction by means of which this might be accomplished. In this view the wheel shaft 16 is mounted in a flexible bearing bracket 17' which is secured at its one extremity to the base plate, which is indicated at 14' at 18', the other extremity being maintained above the base plate by the inherent elasticity of the bracket. An adjusting screw 19' is provided by means of which the latter extremity of the bracket can be drawn toward the base plate or allowed to rise thereabove. This allows a very minute adjustment to be made of the amount of entrance of the teeth into the work.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. Means for guiding a power driven hand saw of the type having a base shoe, comprising a bearing bracket attached to the upper face of said base shoe; a shaft mounted in said bearing bracket; a wheel carried on said shaft so as to be beyond said base shoe and project therebelow, and projections on said wheel adapted to enter the work ahead of said saw.

2. Means for guiding a power driven hand saw of the type having a base shoe, comprising a bearing bracket attached to the upper face of said base shoe; a shaft mounted in said bearing bracket; a wheel carried on said shaft so as to be beyond said base shoe and project therebelow; projections on said wheel adapted to enter the work ahead of said saw and an adjusting member adapted to change the elevation of said shaft above said base shoe.

3. Means for guiding a power driven hand saw having a base shoe adapted to rest upon the work comprising: a wheel and means for securing said wheel to said base shoe so that it will project therebelow and travel on said work immediately ahead of said saw.

In testimony whereof, I affix my signature.

ALFRED WIKSTROM.